O. MOSIER.
STUMP PULLER.
APPLICATION FILED MAR. 22, 1919.

1,320,636.

Patented Nov. 4, 1919.
2 SHEETS—SHEET 1.

WITNESSES

INVENTOR
OSA MOSIER

BY
ATTYS.

UNITED STATES PATENT OFFICE.

OSA MOSIER, OF SEXSMITH, ALBERTA, CANADA.

STUMP-PULLER.

1,320,636.  Specification of Letters Patent.  Patented Nov. 4, 1919.

Application filed March 22, 1919. Serial No. 284,409.

*To all whom it may concern:*

Be it known that I, OSA MOSIER, a subject of the King of Great Britain, and resident of the town of Sexsmith, in the Province of Alberta and Dominion of Canada, have invented certain new and useful Improvements in Stump-Pullers, of which the following is a specification.

This invention relates to improvements in stump pullers, and the objects of the invention are to permit of a pulling force being advantageously and economically applied to a stump being removed, so that the operation can be carried out with a minimum of time and labor, to render the stump puller capable of being easily and conveniently anchored in position, to prevent overhauling, to simplify the construction and render the several parts readily accessible for inspection or repair, and generally to adapt the several parts to better perform the functions required of them.

With the above and other objects in view, the invention consists essentially of the improved construction particularly described and set forth in the following specification and accompanying drawings forming part of the same.

In the drawings.

Like characters of reference refer to like parts in the several figures.

Figure 1:
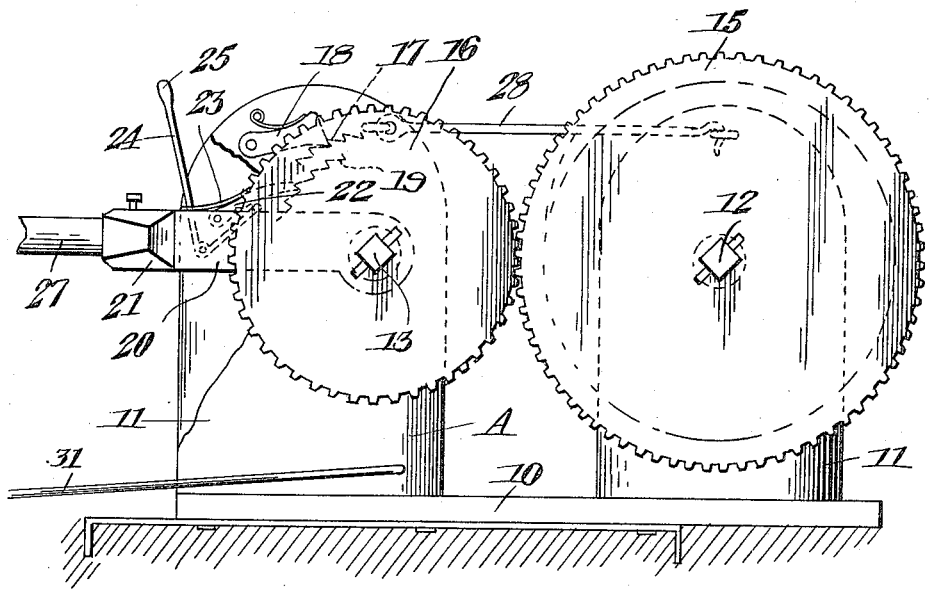
Figure 1 is a side elevation of the improved stump puller.
Figure 2:
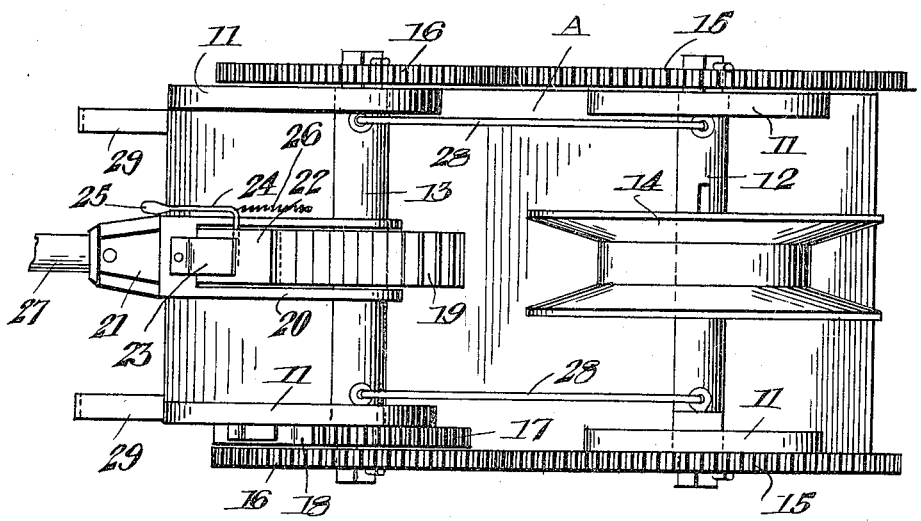
Fig. 2 is a plan view of the same.
Figure 3:
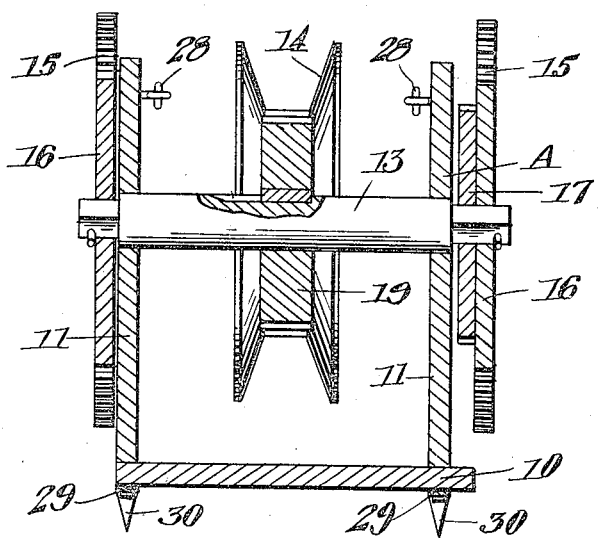
Fig. 3 is a vertical section of the improved stump puller.
Figure 4:
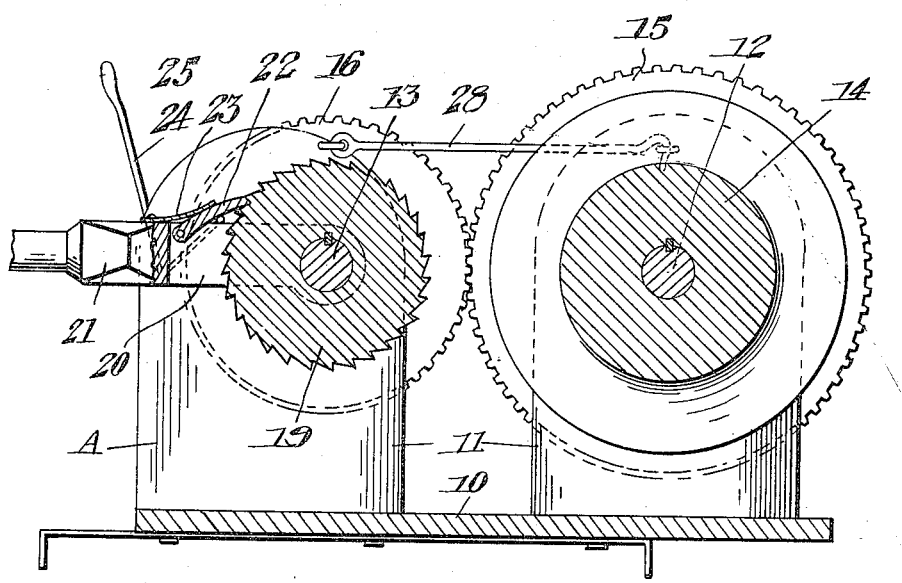
Fig. 4 is a longitudinal section of the improved stump puller.

Referring to the drawings, A represents the frame of the improved stump puller comprising a base 10 provided with side walls 11 adapted to form bearings to rotatably support the shafts 12 and 13, on the former of which a rope pulley 14 is rigidly mounted.

The ends of the shafts 12 and 13 are slightly over-hung and squared, and the shaft 12 is provided on the said squared ends with gears 15 adapted to mesh with the gears 16 mounted on the squared ends of the shaft 13.

Between one of the gears 16 and an adjacent side wall 11 of the stump puller, a ratchet wheel 17 is mounted on the shaft 13 with which ratchet wheel the spring controlled dog 18 is adapted to engage to prevent overhauling of the mechanism, as will be explained hereafter.

The shaft 13 is provided intermediate of its length with a ratchet wheel 19 keyed or otherwise suitably secured thereon, and this ratchet wheel is embraced by the bifurcated end 20 of the operating lever 21 which is rotatably mounted on the said shaft.

This operating lever is provided with a pivotally mounted dog 22 which coacts with the ratchet wheel 19 and this dog is normally held in operative position by a leaf spring 23.

This dog can be manually disengaged from the ratchet wheel 19, and to facilitate carrying out this operation, I provide a lever 24 pivotally mounted intermediate of its length and having its lower end designed to underlie the dog 22, while its upper end terminates in a hand grip 25.

This lever 24 is held in a normal inoperative position by means of a spring 25, so that the lower end of the lever is disengaged from the dog 22 and thus allows the dog to be intimately pressed into contact with the ratchet wheel 19 by the spring 23.

The lever 21 is provided in the end with a socket adapted to receive a rod 27 whereby the effective leverage may be increased, and so the power transmitted to the ratchet wheel 19 can be increased to suit the requirements of the work being performed.

In the embodiment illustrated, it will be seen that the side walls 11 are formed in two distinct portions and these are suitably connected by means of tension rods 28, so preventing any liability of the gears 15 and 16 going out of mesh or the side walls spreading.

On the bottom of the base 10, a plurality of longitudinal extending bars 29 are secured, the ends 30 of which are pointed and offset downwardly, so that they will readily dig into the ground and so hold the stump puller in position. If a further anchoring means is required a rope or like flexible member 31 may be attached to the side walls 11, and after passing around any suitable anchoring post tied, so that there is no possibility of the stump puller being moved bodily when in operation.

The assembly of the stump puller will be readily understood from the foregoing description.

When this device is in use, a flexible member in the form of a rope is coiled around the pulley 14 and the free end of the rope is attached to the stump to be pulled. The stump puller is placed in a suitable position relatively to the stump being pulled and the pointed offset ends 30 of the bars 29 bite into the ground and so anchor the puller in position.

The rod 27 and lever 21 are now oscillated in a vertical plane and during each upward movement of the lever, the ratchet wheel 19 is rotated through a predetermined distance, and this ratchet wheel in turn rotates the shaft 13 and transmits the motion of the same through the gears 15 and 16 to the shaft 12, so rotating the pulley 14 and coiling the flexible member thereon, thus transmitting a pull to the stump being removed.

When the lever 21 has reached the upper limit of its stroke and is being pulled downwardly preparatory to making another stroke, the dog 18 engages with the ratchet wheel 17 and so prevents overhauling. After the lever 21 has been successively oscillated in the manner above described, the pull applied to the stump will be sufficient to remove the same and when it is necessary to uncoil the flexible member from the pulley 14, preparatory to pulling another stump, the handle 27 is disengaged from the lever 21 and the lever 24 is then actuated to disengage the pawl 22 from the ratchet wheel 19, while simultaneously the dog 18 is disengaged from the ratchet wheel 17 permitting the flexible member being freely uncoiled from the pulley 14.

By forming the said walls 11 in distinct portions, there is very little liability of the gears 15 and 16 binding should the pull applied to the flexible member coiled around the pulley incline to twist the machine and thus there is little or no chance of breakage occurring in the gears.

From the above description, it will be seen that I have invented a stump puller which can be advantageously utilized by farmers and the like, readily moved from place to place wherever the work is to be performed, while the setting up of the machine is of an extremely simple nature, so that the operation of the same can be carried out by unskilled labor.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A stump puller comprising a base, side walls on the base, formed in sections, rods securing the said sections of the side walls together, shafts rotatably mounted on the side walls, intermeshing gears on the shafts, a rope pulley on one of the shafts, and means for rotating the shafts.

In witness whereof I have hereunto set my hand in the presence of two witnesses.

OSA MOSIER.

Witnesses:
A. SHAND,
F. L. HOWARD.

Copies of this patent may be obtained for five cents each, by addressing the "Commissioner of Patents, Washington, D. C."